United States Patent [19]

Inaba et al.

[11] Patent Number: 4,741,685
[45] Date of Patent: May 3, 1988

[54] INJECTION DRIVE APPARATUS

[75] Inventors: Yoshiharu Inaba, Kawasaki; Fumio Mitoguchi, Hino; Keiji Sakamoto; Masatoyo Sogabe, both of Hachioji, all of Japan

[73] Assignee: Fanuc Ltd, Minamitsuru, Japan

[21] Appl. No.: 86,141

[22] PCT Filed: Nov. 29, 1986

[86] PCT No.: PCT/JP86/00612

§ 371 Date: Jul. 27, 1987

§ 102(e) Date: Jul. 27, 1987

[87] PCT Pub. No.: WO87/03246

PCT Pub. Date: Jun. 4, 1987

[30] Foreign Application Priority Data

Nov. 30, 1985 [JP] Japan ............................... 60-268296

[51] Int. Cl.[4] ........................................... B29C 45/80
[52] U.S. Cl. ..................... 425/145; 264/40.5; 366/78; 425/171; 425/376 B; 425/574; 425/587
[58] Field of Search ............... 425/145, 171, 204, 207, 425/208, 376 B, 574, 582, 583, 587; 264/40.1, 40.5; 366/78

[56] References Cited

FOREIGN PATENT DOCUMENTS 125618 7/1985 Japan.

Primary Examiner—Jay H. Woo
Assistant Examiner—Timothy W. Heitbrink
Attorney, Agent, or Firm—Staas & Halsey

[57] ABSTRACT

In order to obtain an injection drive apparatus which is low-priced, can produce a great output torque, and has a satisfactory acceleration/deceleration characteristic, in an injection-molding machine which performs injection by driving a screw by means of servomotors, one or more ball screws (7), used to drive a screw (2) in the axial direction, are driven by means of a plurality of servomotors (M1, M2), a position detector (P1) for detecting the screw position is provided only for one servomotor (M1), and the servomotors (M1, M2) are provided individually with power amplifiers, which are controlled by means of one control circuit so that the individual servomotors (M1, M2) are controlled in synchronism with one another.

4 Claims, 2 Drawing Sheets

INJECTION DRIVE APPARATUS

TECHNICAL FIELD

The present invention relates to an injection-molding machine, and more specifically, to an injection apparatus of an injection-molding machine, which, using a servomotor as a drive source, performs injection by moving a screw in the axial direction by means of the motor.

BACKGROUND ART

Conventionally, hydraulic pressure has been utilized for a drive source of an injection apparatus which performs injection by moving a screw in the axial direction thereof. Recently have been developed injection-molding machines which use a servomotor as the drive source of the injection apparatus. In this case, the servomotor must be increased in size, in order to make the injection-molding machines large-sized for a higher injection output. If the servomotor is increased in size, then it is a very special motor, which costs high. The moment of inertia, which greatly influences the rise- and fall-time performance of the motor, increases in proportion to the fourth power of the rotor diameter of the motor. If the servomotor used is large-sized, therefore, the moment of inertia is so high that it is very difficult, technically, to obtain a satisfactory acceleration/deceleration characteristic. Thereupon, a system has been proposed in which an injection mechanism is driven by mean of a plurality of motors (see Japanese Patent Disclosure No. 60-125618).

DISCLOSURE OF THE INVENTION

It is an object of the present invention to provide an injection apparatus of a type in which an injection mechanism is driven, for injection, by means of a plurality of servomotors, so that the injection apparatus can enjoy higher output power, improved acceleration/deceleration characteristic, and lower cost.

In order to achieve the above object, according to the present invention, there is provided an injection drive apparatus for injection molding which is adapted to perform injection by moving a screw in the axial direction by means of ball screw means driven by servomotors. In this apparatus, the ball screw means is driven by means of a plurality of servomotors, and a position detector is attached to only one of the servomotors. A torque command is delivered to power amplifiers, which are provided individually for the servomotors, by a control unit which receives a signal from the position detector, whereby the drive of the individual servomotors is controlled. More specifically, the position of the screw is detected by the position detector, and the control unit delivers the torque command to the power amplifiers of the servomotors in accordance with the detected screw position and an input speed command, thereby driving the individual servomotors in synchronism with one another, for injection-speed control and injection-pressure control of the screw.

Thus, a plurality of servomotors are used to drive the screw for injection, so that a great injection torque can be produced. Since the rotor diameter of each servomotor can be small, moreover, the moment of inertia of each rotor is small. Accordingly, the total moment of inertia of a plurality of servomotors, for use as the drive source of the injection apparatus, can be made much smaller than the moment of inertia of one servomotor which can produce the same torque as that of the drive source according to the present invention. As a result, the acceleration/deceleration characteristic of the injection apparatus is improved, thereby permitting satisfactory injection control with high responsiveness. Despite the use of a plurality of servomotors, moreover, the position detector, such as an pulse encoder, which is expensive, may be one in number. In the control unit for controlling the servomotors, furthermore, only the power amplifiers need be increased in number to accord with the number of servomotors, and only one control circuit is needed besides, thus ensuring high economical efficiency. Further, no large-sized servomotors are needed to produce a large torque, so that the drive source can be composed of commercially available, mass-produced servomotors, which are low-priced. Also on account of this, the injection apparatus itself can be manufactured at low cost, even though the injection-molding machine itself is large-sized.

BEST MODE OF CARRYING OUT THE INVENTION

Figure 1:
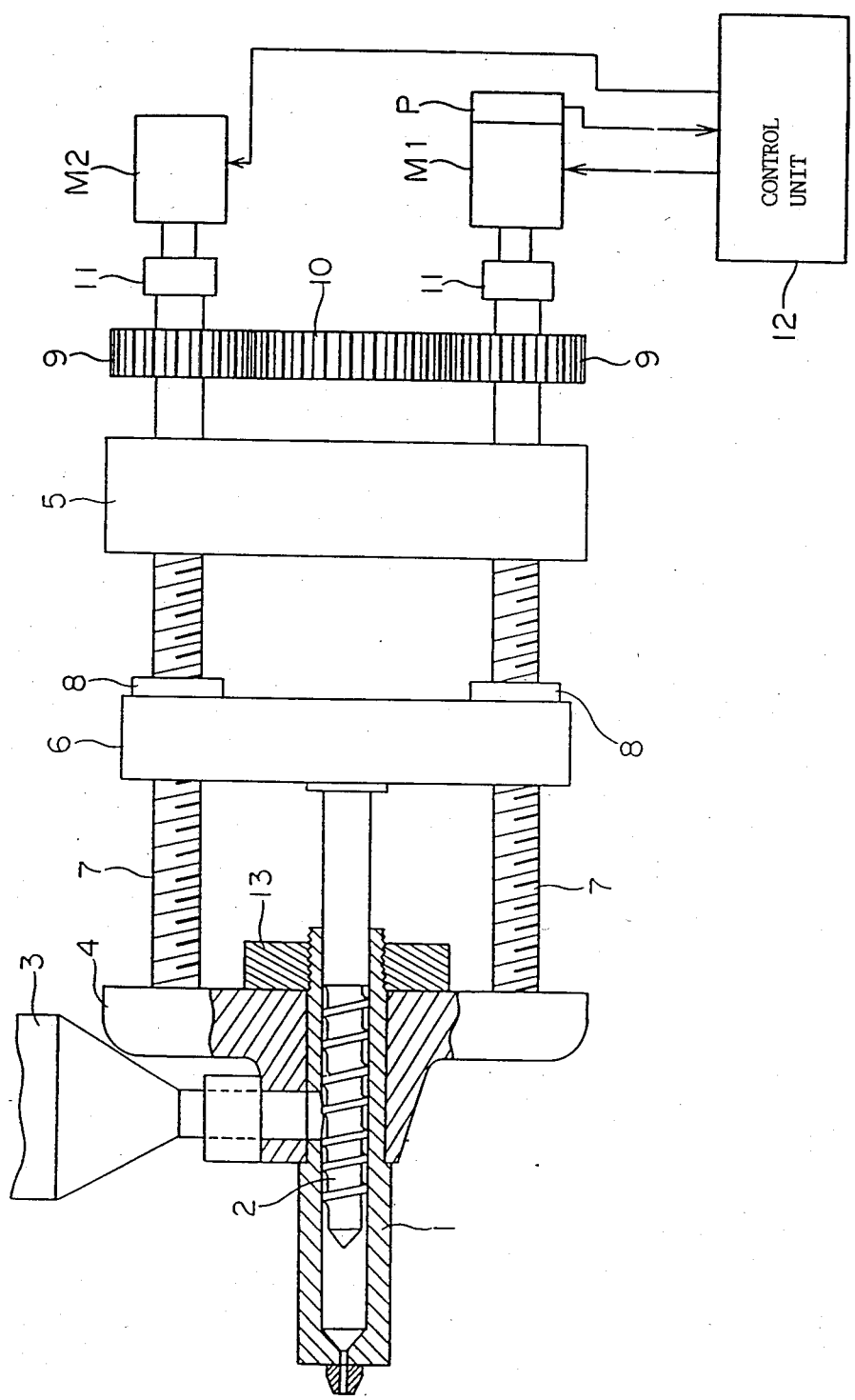
FIG. 1 is a schematic view showing the principal part of an injection apparatus according to an embodiment of the present invention.

FIG. 1 shows the principal part of an injection apparatus according to the present invention, in which a screw 2 is located inside a heating cylinder 1 for rotation and reciprocation. The heating cylinder 1 communicates with a hopper 3 which is used to feed a molding material into the cylinder. A front plate 4 and a rear plate 5 are fixed to a base (not shown) of an injection-molding machine, and are coupled to each other by means of several tie rods (not shown).

The heating cylinder 1 is fixed to the front plate 4 by means of a barrel nut 13, and the rear end of the screw 2 is attached to a pressure plate 6 so that it is rotatable but immovable in the axial direction. Two ball screws 7 are rotatably mounted between the front and rear plates 4 and 5, and are screwed individually in ball nuts 8, 8 attached to the pressure plate 6. Servomotors M1 and M2 of substantially the same construction are coupled to the respective shanks of the ball screws 7, 7 by means of coupling means 11, individually. Thus, the ball screws 7, 7 can be driven by their corresponding servomotors M1 and M2. Also, gears 9, 9 are fixed on the respective shanks of the ball screws 7, 7, and a phase-retention gear 10 is in mesh with both of the gears 9, 9. Only the one servomotor M1, out of the two servomotors M1 and M2, is provided with a position detector P, such as a pulse encoder, which serves to detect the rotational position of the servomotor, i.e., the axial position of the screw 2. The output of the position detector P is applied to the input of a control unit 12, and the drive of the two servomotors M1 and M2 are controlled by the control unit 12. A description of a rotating mechanism for the screw 2, which has no relation to the present invention, is omitted herein.

Figure 2:
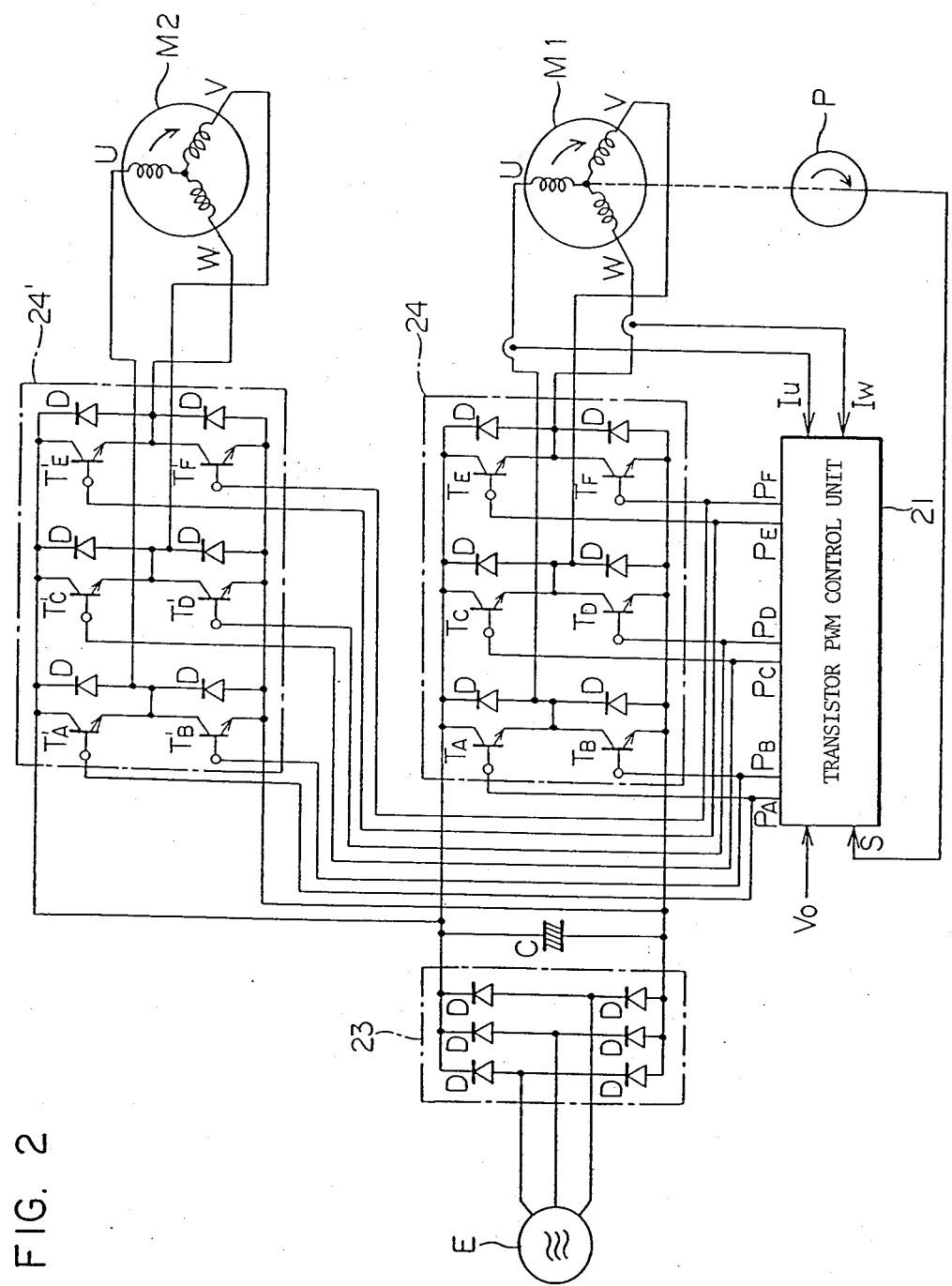
FIG. 2 is a schematic circuit diagram of a control unit shown in FIG. 1.

FIG. 2 shows the control unit 12. In the present embodiment, permanent-magnet synchronous motors are used as the servomotors M1 and M2. A control circuit for one such servomotor is generally known as a PWM control unit. The control unit of this embodiment differs from the conventional one in that it has two transistor inverters, as power amplifiers, connected in parallel with each other. Namely, in FIG. 2, the output of a three-phase power source is rectified by means of a rectifier 23, and is applied to transistor inverters 24 and 24' for use as power amplifiers. The servomotors M1 and M2 are driven by the respective outputs of the transistor inverters 24 and 24'. In the conventional PWM control unit, one servomotor is driven by means of only one transistor inverter 24. According to the present embodiment, on the other hand, the additional transistor inverter 24' is connected in parallel with the transistor inverter 24, and is used to drive its corresponding servomotor M2. The two transistor inverters 24 and 24' are connected in parallel with a transistor PWM control circuit 21, and are driven thereby in synchronism with each other. Symbol P designates the position detector, such as a pulse encoder, for detecting the position and speed of a rotor of the servomotor M1.

The transistor PWM control circuit 21 compares a present speed S, detected by the position detector P, with a speed command V0 from a host control unit, such as a numerical control unit, and delivers PWM signals PA to PF, as torque commands. In response to these torque commands, transistors TA to TF and TA' to TF' of the transistor inverters 24 and 24' are turned on or off. In this manner, the control circuit 21 controls currents flowing through the U-, V-, and W-phase windings of the servomotors M1 and M2; thereby controlling the rotating speed of the servomotors M1 and M2. Thus, in response to PWM signals PA and PB delivered from the transistor PWM control circuit 21, the transistors TA and TA' and the transistors TB and TB' of the transistor inverters 24 and 24' are simultaneously turned on or off, whereby the currents flowing through the respective U-phase windings of the servomotors M1 and M2 are controlled. Likewise, in response to PWM signals PC and PD, the transistors TC and TC' and the transistors TD and TD' are simultaneously turned on or off, whereby the currents flowing through the respective V-phase windings of the servomotors M1 and M2 are controlled. In response to the PWM signals PE and PF, moreover, the transistors TE and TE' and the transistors TF and TF' are simultaneously turned on or off, whereby the currents flowing through the respective W-phase windings of the servomotors M1 and M2 are controlled. As a result, the servomotors M1 and M2 are driven in synchronism with each other so as to produce the same torque. A detailed description of the transistor PWM control circuit 21, which is a conventional one, is omitted herein.

The operation of the apparatus according to the present embodiment will now be described.

When the speed command value V0 from the host control unit, such as a numerical control unit, is applied to the transistor PWM control unit 21 of the control unit 12, the transistor PWM control unit 21 compares the speed command value V0 with the present speed S detected by the position detector P. In accordance with the difference between the value V0 and the speed S, the control circuit 21 delivers the PWM signals PA to PF as torque commands, and causes the transistor inverters 24 and 24' to drive the servomotors M1 and M2, thus controlling the rotating speeds of these motors for a command speed. At this time, the transistors of the corresponding phases of the transistor inverters 24 and 24', serving to control the currents flowing through the windings of the individual phases of the servomotors M1 and M2, are turned on or off in accordance with the same PWM signal, so that one and the same current flows synchronously through the windings of each phase of the servomotors M1 and M2. Accordingly, the servomotors M1 and M2 rotate in synchronism with each other and with the same torque, thereby driving the ball screws 7, 7. Further, the phase-retention gear 10 is in mesh with the gears 9, 9 mounted on the two ball screws 7, 7, thus preventing a phase difference or rotational lag of between the gears 9, 9. Therefore, the ball screws 7, 7 rotate in synchronism with each other. Accordingly, the ball nuts 8, 8, fitted on the ball screws 7, 7, move in the axial direction of the ball screws, thereby causing the pressure plate 6, on which the ball nuts 8, 8 are mounted, to move in the axial direction. Thereupon, the screw 2 advances (to the left of FIG. 1), so that resin is injected. Thus, a great output can be obtained with use of a plurality of servomotors.

In the embodiment described above, the two ball screws 7 are used to move the pressure plate 6 in the axial direction of the screw 2, and the servomotors M1 and M2 are coupled individually to the ball screws 7, 7. However, the ball screws need not always be two in number, and only one ball screw will do for the purpose, as stated in Japanese Patent Disclosure No. 60-125618. Alternatively, a plurality of ball screws may be arranged at regular intervals on the circumference of one and the same circle around the central axis of the screw 2. In this case, the ball screws are screwed into their corresponding ball nuts fixed to the pressure plate 6, in a manner such that the pressure plate 6 is moved by the ball screws. Moreover, the servomotor(s) need not correspond in number to the ball screw(s). A plurality of servomotors may be used to drive one or more ball screws by means of a transmission mechanism. If the number of servomotors used is increased, the circuit for driving the servomotors can be constructed by only increasing the transistor inverters to the same number as the increased servomotors, and connecting those increased inverters in parallel with the transistor inverters 24 and 24'. Thus, the position detector P, such as a pulse encoder, and the transistor PWM control circuit 21 need not be increased in number. Although the AC servomotors, each composed of a permanent-magnet synchronous motor, are used in the embodiment described above, moreover, DC servomotors may be used only if their control circuit is arranged so that only the power amplifiers are increased and connected in parallel with one another, while the other elements, including the control circuit and the position detector, are provided for common use. Furthermore, a pulley and a timing belt may be used for phase retention, in place of the gears 9 and 10 for phase retention.

We claim:

1. In an injection drive apparatus for injection molding adapted to perform injection by moving a screw in an axial direction by means of ball screw means driven by servomotors, said injection drive apparatus comprising a plurality of servomotors for driving said ball screw means, a position detector attached to one of said plurality of servomotors, and a control unit adapted to deliver a torque command to power amplifiers, said power amplifiers provided individually for said plurality of servomotors, on reception of a signal from said position detector, thereby controlling the drive of the individual servomotors.

2. An injection drive apparatus according to claim 1, wherein said screw is rotatably mounted on a pressure plate, said ball screw means includes a plurality of ball screws mating individually with a plurality of ball nuts fixed to said pressure plate, said plurality of ball screws being driven by said plurality of servomotors, and phase-retention means for identical phases being coupled between said plurality of ball screws.

3. An injection drive apparatus according to claim 2, wherein said phase-retention means is composed of gears fixed to said ball screws and a phase-retention gear in mesh with said gears.

4. An injection drive apparatus according to claim 1, 2 or 3, wherein said control unit is a transistor PWM control circuit, and each said power amplifier, provided for each said corresponding servomotor, is a transistor inverter.

* * * * *